United States Patent [19]

Tunador et al.

[11] 4,265,608

[45] May 5, 1981

[54] ENDLESS BELT MOLDING APPARATUS

[75] Inventors: Malik Tunador; Manoj K. Wangu, both of Pittsburgh, Pa.

[73] Assignee: Tunador Engineering, Inc., Oakdale, Pa.

[21] Appl. No.: 164,804

[22] Filed: Jun. 30, 1980

[51] Int. Cl.³ .......................... B30B 3/00; B29C 3/06; B30B 15/16
[52] U.S. Cl. ..................................... 425/149; 425/371
[58] Field of Search ....................... 425/149, 150, 371

[56] References Cited

U.S. PATENT DOCUMENTS

| | | | |
|---|---|---|---|
| 3,647,309 | 3/1972 | Thompson | 425/150 X |
| 3,837,774 | 9/1974 | Ross et al. | 425/150 X |
| 4,017,235 | 4/1977 | Ahrweiler | 425/150 X |

Primary Examiner—J. Howard Flint, Jr.
Attorney, Agent, or Firm—Reed, Smith, Shaw & McClay

[57] ABSTRACT

The invention disclosed herein relates to an endless belt molding apparatus for the continuous molding of high pressure plastic foam products. The invention disclosed requires first and second adjustably spaced a part rotating endless belts between which the foamed product is molded. The space between the belts is vertically movable by means of fluid operated lifting/clamping means. The lifting/clamping means in cooperation with gauge blocks provide precise control of the space between the belts. Synchronized rotation of the belts is provided for any vertical positioning of the belts by a vertically extendable drive means rigidly coupled and mounted to said belts. A control circuit for the operation of the lifting/clamping means includes analogue sensing means positioned at selected locations between the first and second belts which provide signals representative of the pressures exerted by the foamed product during molding. The signals from the analogue sensing means are inputted to a control circuit for the fluid operated lifting/clamping means to adjust the spacing between on the speed of said belts in response to local variations in molding pressure.

9 Claims, 5 Drawing Figures

ENDLESS BELT MOLDING APPARATUS

FIELD OF THE INVENTION

The present invention relates to endless conveyors used for the molding of rigid foam products, and in particular, to an endless belt molding apparatus adapted for use in molding high pressure rigid foam products in which the belts can be synchronously driven during vertical adjustment of the mold space therebetween.

BACKGROUND OF THE INVENTION

Equipment employing spaced apart moving endless conveyor belts as the mold surfaces for continuous foam panel products is old and generally well known to those in the art. Numerous devices have been proposed, see e.g., U.S. Pat. Nos. 3,082,861 and 3,093,232. Continuous foam molding apparatus have been commercially available for many years. Many of these devices incorporate one or more improvements which have been made over the years such as the use of pneumatic clamping means, U.S. Pat. No. 3,568,245; the use of micro-switches to sense pressure build-ups between the belts, U.S. Pat. No. 3,994,648; side clamps, U.S. Pat. No. Re 29,125; panel type conveyors, U.S. Pat. No. 3,674,130; conveyor rails and rollers, U.S. Pat. No. 3,037,603; and the like.

In general, the production of continuous foam panels involves the use of a pair of continuous outer sheets of flexible material, such as paper, bent to include dependent sides. Respective sheets of material are fed to a molding machine having a pair of spaced apart endless belts so that each sheet is adapted to abut one of the belts. Foamable resins are continuously injected or spread between the sheets during operation of the machine. As the resin product travels between the belts, it begins to foam and expand to fill the space there and exert a pressure on the belts. These belts act as the mold cavity to constrain the foam and shape the final product.

While numerous improvements have been made in endless belt molding apparatus to provide more uniform products and attain high speed production, none of the prior art molding apparatus is capable of high speed molding at pressures in excess of 15 psi. Conventional endless belt molding apparatus operation with foam pressures ranging between 3 and 5 psi. One of the major problems associated with high pressure, high speed molding is that excess localized pressures can build-up during the foaming process. Unless that pressure is relieved, serious damage can result to the equipment.

Recent improvements in such equipment provide means for sensing such build-ups and to actuate controls to increase the spacing between the endless belts. A conventional method for protecting against excess pressure build-up, for example, U.S. Pat. No. 3,994,648, uses micro-switches to sense the pressure build-up by the disengagement of the switch contacts when such pressure raises one of the belts from the gauge block. The switches actuate an adjustable spacing means to lift the upper belt away from the product and completely relieve the pressure on the apparatus.

However, one of the disadvantages of such methods is that it normally results in a shutdown of the machine causing the product to backup. This results from the fact that the sensing means do not provide continuous monitoring of the pressure build-up, but rather an abrupt disengagement when a selected pressure is reached. Furthermore, conventional drive means do not permit synchronous rotation of the belts once a belt is raised. Accordingly, it is one of the objects of the present invention to provide an endless belt molding apparatus having means for continuously sensing pressure build-up during the molding operation and to permit relief thereof without stopping production. It is a further object of the present invention to provide a molding apparatus capable of operating with high pressure generating foam materials. It is still further object of the present invention to provide a drive means for synchronous rotation of the belts during vertical movement of the belts.

SUMMARY OF THE INVENTION

Generally, the endless belt molding apparatus of the present invention comprises first and second spaced apart belts. Each of the endless belts is mounted on a separate frame and includes a plurality of slats which define two major surfaces of the continuous mold cavity. Adjustable or fixed longitudinal sides are provided to complete the mold cavity. Preferably, the support frame for the first endless belt is rigidly mounted to a floor or like structural support. The support frame for the second endless belt is mounted to the support frame of first belt by fluid operated lifting/clamping means.

The fluid operated lifting/clamping means are preferably positioned to and between the support frames of the two belts. The lifting/clamping means, preferably double acting hydraulic cylinders, are used in combination with vertical guides to both lift the second belt to relieve any excess pressure that might be asserted by the foam as well as afford maintenance clearance and to clamp the second belt in the selected spaced apart relationship. In the clamping mode, the cylinders are used to lower the frame of the second belt onto gauge blocks which are positioned on the first frame to establish the thickness of the foam product. When the entire second frame is properly positioned on the respective gauge blocks the hydraulic cylinders clamp the second frame onto the gauge blocks of the first frame. Preferably, the clamping pressure asserted is slightly in excess of the maximum pressure expected from the foam product.

In addition to the gauge blocks, a number of analogue sensing means, preferably load cells, are selectively positioned between the second frame and associated gauge blocks. The sensing means provide output signals of values proportional to the pressures asserted by the second belt. The sensing means are capable of detecting any localized pressure excesses during the foam process and providing a signal to control the lifting of the second belt. Each sensing means also includes a relay circuit used to control the lowering of the second belt to assure proper seating of the second frame before clamping pressure is applied.

The invention also provides a drive means for synchronously driving the first and second endless belts regardless of the vertical position of the second endless belt. Preferably, the drive means includes a motor mounted to and movable with the second frame. The motor is connected to the drive sprockets of the first and second belts through associated shaft mounted first and second speed reducers. The motor is directly connected to the second speed reducer which in turn is connected to the first reducer through a splined extendable drive coupler. The extendable drive coupler preferably comprises concentricly splined inner and outer members connected to the respective speed reducers by means of pivotable connecting means. The drive means of the present invention provides rigid, synchronous drive to both belts from one motor in any vertical belt plane as well as during any vertical adjustment.

A control circuit for the hydraulic lifting/clamping cylinders is provided in combination with the sensing means to raise the second belt in the event of excessive foam pressures. The control system affords sufficient vertical adjustment or speed variation to the second belt to reduce over pressures on the belt slats without the slats losing contact with the foam product. Other advantages of the present invention will become apparent from a persual of the following detailed description of a presently preferred embodiment of the invention taken in combination with the accompanying drawings.

BRIEF DESCRIPTION OF THE INVENTION

Figure 1:
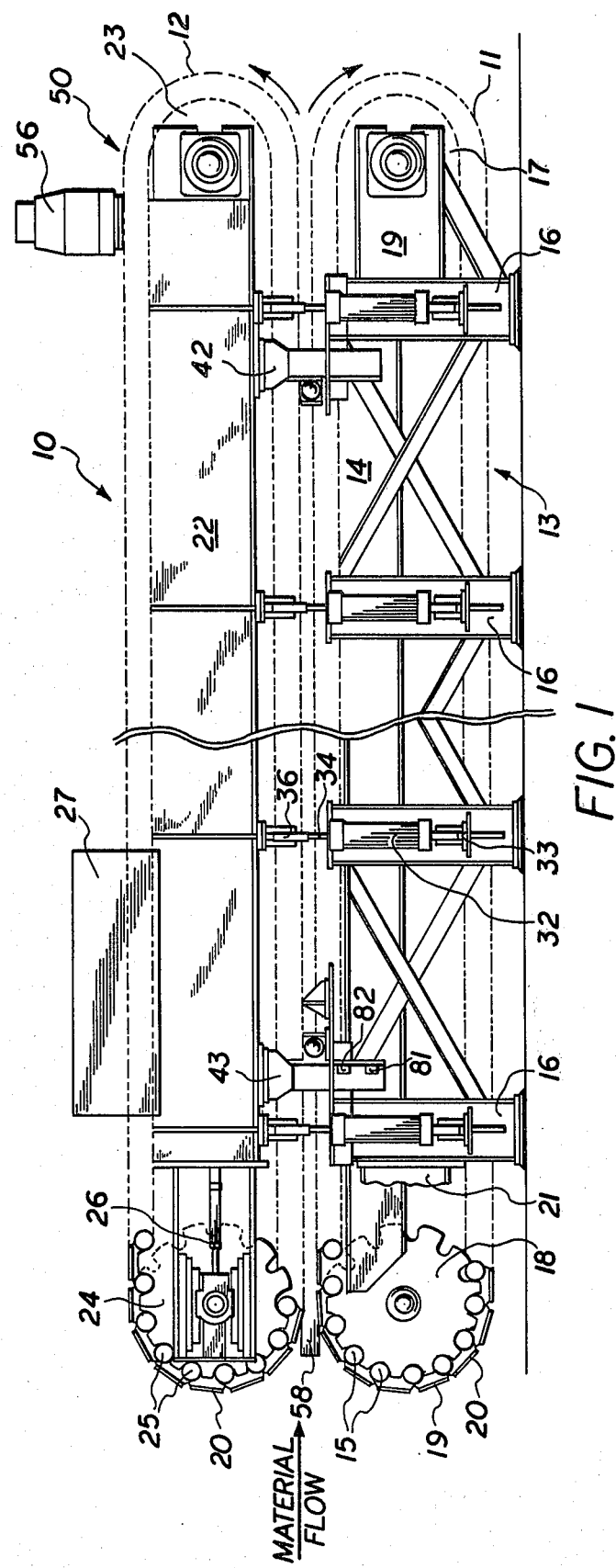
FIG. 1 is a side elevation of the molding apparatus of the present invention showing the first and second endless belts associated supporting frames and lifting/clamping means.

Referring to FIG. 1, endless belt molding apparatus 10 comprises first and second endless belts 11 and 12, respectively. First belt 11 is mounted on first support frame 13 which is rigidly mounted to a floor or other structural support, including longitudinal support members 14 supported by a plurality of vertical supports columns 16. Belt 11 is entrained about drive sprocket 17 and take-up sprocket 18 which are mounted on horizontal support members 19 and 21, respectively. Belt 11 includes rollers 15 which travel in tracks, not shown, which are supported by first frame 13. First belt 11 includes a plurality of slats 20 which define a portion of the mold cavity and the surface against which the product is restrained.

Second belt 12 is supported by second longitudinal frame 22 and is entrained around second drive sprocket 23 and second take-up sprocket 24. Second take-up sprocket 24 includes adjustment means 26 to reduce any catenary in belt 12 which may exist. Second belt 12 includes rollers 25 which ride in longitudinal tracks, no shown. As with belt 11, second belt 12 includes a plurality of slats 20 which define the other major surface of the mold cavity. Second frame 22 includes counter-weight 27 positioned in the corner opposite from drive means 50 to counter the weight of motor 56 and associated drive elements which are mounted to frame 22. Counter-weight 27 maybe reduced or dispensed with when motor 56 is mounted on first frame 13 or on the floor.

Figure 3:
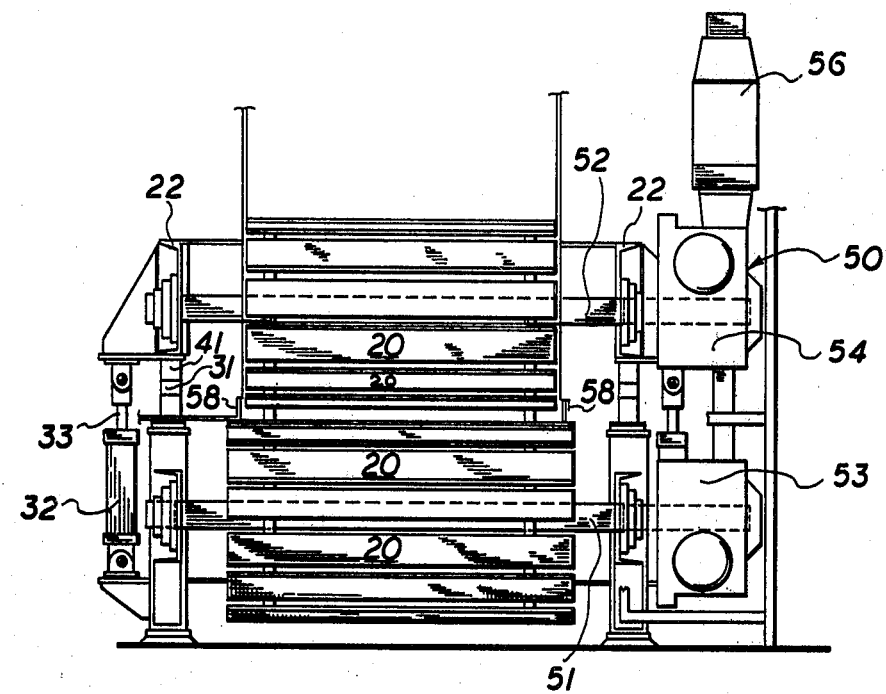
FIG. 3 is a front elevation of the molding apparatus of the present invention showing the vertically extendable drive means and mold cavity formed by the two belts and side members.

The mold cavity is further defined by side members 58, FIG. 3. Members 58 may be either fixed or adjusted. In the preferred embodiment, side members 58 are adjustably mounted to increase or decrease the width of the mold.

Figure 2:
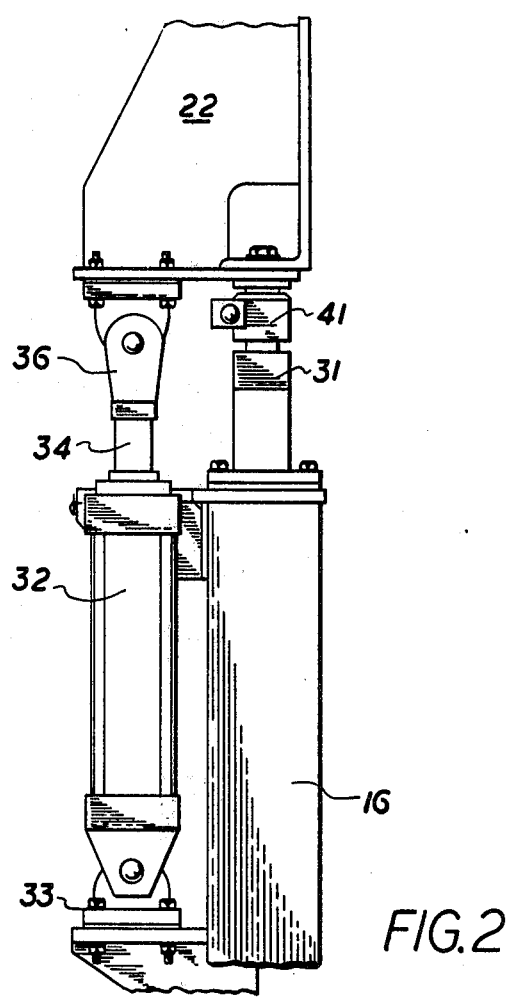
FIG. 2 is an enlarged elevation of the lifting/clamping means of the present invention.

Second frame 22 rests on gauge blocks 31 which are removably mounted to vertical support columns 16, as more clearly shown in FIG. 2. Gauge blocks 31 are located on each column 16 and are used to establish the product thickness. As described more fully hereinafter, certain gauge blocks 31 may include an additional length which is representative of the dimension of the sensing means described hereinafter when sensing means are not used at such location.

With reference to FIGS. 1 and 2 a fluid operated lifting/clamping means 32, preferably a double acting hydraulic cylinder, is rigidly mounted to each vertical support member 16 by mounting means 33. Each cylinder 32 includes extendable rod 34 which is attached to second support frame 22 through clevis 36. Positioned on vertical support columns 16 are gauge blocks 31 and sensing means 41. Preferably, sensing means 41 comprise load cells which are located on all of the vertical support columns 16. However a fewer number maybe used such as the column at the entrance or resin feed side of apparatus 10 and those columns located at the center of apparatus 10, where over-pressures normally first appear, to and including the next to last column. Load cells 41 are, therefore, positioned where over-pressures from the product is most likely to exist; for example, in one embodiment of the present invention which has a length of 30' and utilizes 7 pairs of vertical support columns 16, load cells were utilized on column pairs 1, 4, 5 and 6. On vertical column pairs 2, 3, and 7 gauge blocks having an additional length, equal to the length of a load cell were used instead of load cells 41. While load cells need not be used on each support column 16, it is normally desirable to provide them on each such column to provide more precise pressure detection.

As mentioned above, gauge blocks 31 are removable. They are dimensioned in length to the desired thickness of the continuous foam product to be formed by molding apparatus 10. Accordingly, gauge blocks 31 are used to define the space between first and second belts 11 and 12, respectfully.

In order to insure precise vertical movement and alignment of second frame 22, at least two pairs of guide means are provided. A first pair of fixed guides 42 are located at the drive end of apparatus 10. Guide means 42 includes a contoured outer receiving member mounted to first frame means 13 as shown in FIG. 1, and cooperating contoured inner guides (not shown) adapted to slidingly fit within the outer receiving member. Guide means 43 is located at the material feed end, and is slidably mounted to first frame 13. Guide means 43 is similar in design to guide 42 except that is spring biased for slidable mounting to first frame 13 to prevent misalignment due to differential expansion. Also located on the guide means 43 are first and second switches 81 and 82 which are used to signal the "nearly" down and full up positions, respectively. It is to be understood that the full down position sensed by load cells 41 is relative to the gauge blocks 31.

Figure 4:
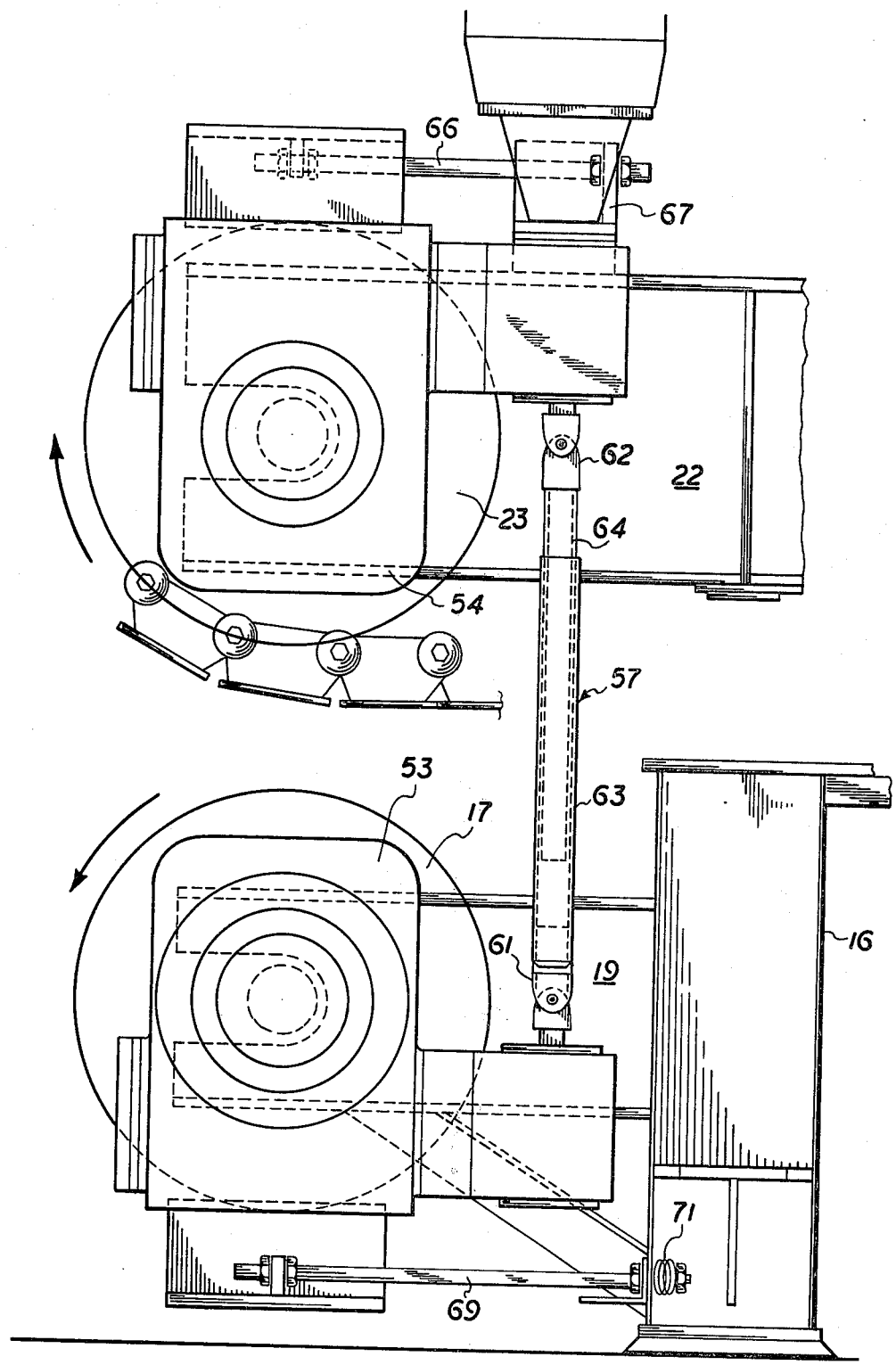
FIG. 4 is a side elevation, in partial section, showing the drive means of the present invention.

With reference to FIGS. 3 and 4, drive means 50 includes first and second drive shafts 51 and 52 associated with the first and second belt means 11 and 12, respectfully. Drive shafts 51 and 52 are connected to the associated drive sprockets 17 and 23 to impart power to belts 11 and 12. Mounted to each of the respective drive shafts 51 and 52 are first and second speed reducers 53 and 54, respectively, which may be a gear, belt or similar type of speed reducing means. As shown, electric motor 56 is mounted to second speed reducer 54, however, motor 56 can be mounted to either the first or second frames 13 and 22 or to the floor depending on space availability. In the present embodiment, motor 56 and second speed reducer 54 are adaptable for vertical movement with second frame 22.

First speed reducer 53 is mounted to drive shaft 51, but may be mounted to first frame 13. Speed reducer 53 is operably connected to second speed reducer 54 by means of splined drive coupler 57. Drive coupler 57 is pivotally connected to the associated speed reducers through universal joints 61 and 62. Drive coupler 57 comprises an outer member 63 and a splined inner member 64 adapted to slidingly travel within outer member 63. The splined engagement between inner member 64 and outer member 63 permits continued rotation of coupler 57 during vertical movement of second frame 22. In addition second belt 12 can be raised in direct vertical direction rather than in an accurate manner as a number of prior art machines.

Also shown on FIG. 4 is torque arm 66 which connects second speed reducer 54 to second frame 22 at mounting means 67. Torque arm 69 is mounted between first speed reducer 53 and vertical support column 16. Preferably, torque arm 69 is connected to vertical support column 16 through a torque take-up means 71 such as disc springs. It has been found that when first and second belts 11 and 12 are rigidly coupled to drive means 50, motor 56 has a tendency to stall during high speed operations. Notwithstanding the adjustability of belt 12 by means of take-up arrange 26, the bottom flight of second belt 12 has been found to form a catenary due to the weight of slats 20. As foaming pressure build against the slats, belt 12 moves slightly beyond drive sprocket 23 the effect of which is to increase the effective radius of drive sprocket 23. Inasmuch as the rotational speeds of the drive sprockets are the same the surface speed of second belt 12 has been effectively increased. Over a short period of time this increase in surface speed gradually builds up a torque in the belt causing the motor to stall. By inclusion of spring 71 to torque arm 69, the amount of spring deflection is proportional to any excess torque which torque is taken up to prevent stalling of the drive means. Thus, after the foam develops its maximum pressure, spring 71 or similar torque take up means for the first belt is necessary to prevent the apparatus from stalling.

With respect to the control circuit, load cells 41 provide a continuous monitoring of the pressure build-up of the foam pressure in the system. The output signal from the cells is used to control the operation of hydraulic cylinders 32 and to provide audible alarm. For example, in the present embodiment, when second frame 22 is in the raised position, there is no load on load cell 41 and a zero signal is impressed across the cell circuit. As frame 22 is lowered by cylinders 32, it touches the respective load cells 41 and dummy gauge blocks 31 when used. Load cells 41 generate an output signal which is proportional to the pressure applied by frame 22 and cylinders 32. Normally associated with each load cell 41 is a relay circuit which is used to prevent structural damage to apparatus 10 by preventing the application of clamping pressure if frame 22 is not evenly positioned on gauge blocks 31, a block is missing or all gauge blocks are not set for the same product thickness. The control circuit preferably includes an adjustable time delay in which all relay contacts must signal proper contact of frame 22 or a signal is generated which causes frame 22 to automatically rise. Otherwise, as frame 22 comes to rest on the load cell 41 and/or dummy gauge blocks 31, the clamping force is increased by cylinders 32. The circuit, in this embodiment, is designed so that if no warning signal is provided it is manually bypassed by the operator until the load cells signal the desired output at which time clamp-down pressure is no further increased.

In the operation of the apparatus, foam asserts a pressure on slats 20 of the first and second belts and against the clamping force asserted by cylinders 32. As the pressure builds up, the signal from load cells at or near the point of pressure build-up begins to decrease. The difference between the expected maximum foam pressure of the product and safety factor (clamping down pressure) and the minimum normal foam pressure defines the normal operating region of apparatus 10. If the foam expands beyond the expected maximum pressure such that the signal output from a load cell 41 continues to decrease, load cell circuits provide a signal to trigger an alarm system for the operator. That same signal can be also used to proportionally release clamping pressure to permit second belt 12 to lift in response to the pressure build-up or can be used to proportionally increase the speed of motor 56 which results in a speed up of the belts and reduction in pressure. Where the signal is used to automatically adjust the operation of apparatus 10 without operator intervention, it is desirable to use a microprocessor to provide the necessary proportionality to the adjustments.

Figure 5:
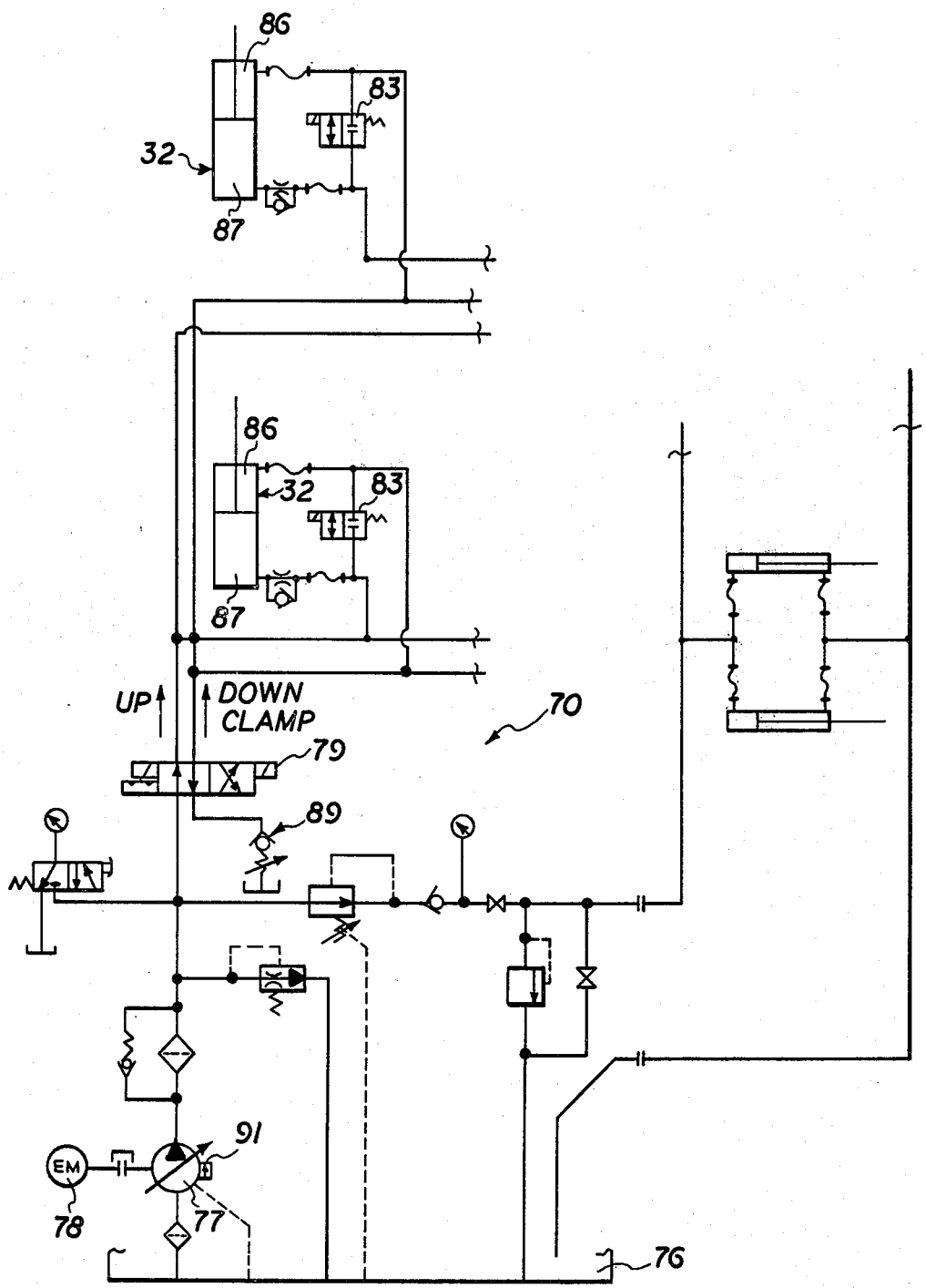
FIG. 5 is a partial schematic of the control circuit for the fluid operated lifting/clamping means.

With reference to FIG. 5 a hydraulic circuit is shown having a hydraulic fluid reservoir 76 and a hydraulic pump 77. Hydraulic pump 77 is operated by a small electric motor 78, for example, a 7½ horsepower motor, capable of operating pump 77 at a rate of 7½ gallons per minute at a pressure of up to 2000 psi. Circuit 70 also includes a manual operator activated valve 79 which is energized to the up position when first limit switch 81 (FIG. 1) is released. Valve 83 is energized to an open position with hydraulic fluid short circuiting from the rod end 86 of cylinder 32 to the blind end 87. Additional oil for the rod end 86 is made up by pump 77 causing cylinder 32 to lift frame 22.

To lower frame 22, the switches are reversed and second limit switch 82 (FIG. 1) and the weights of frame 22 and belt 12 are used. The hydraulic oil is short circuited from the blind end 87 to rod end 86 through the path created due to check valve 89. Check valve 89 is set at the maximum resistance to provide adequate line pressure to lift belt 12. Clamping, on the other hand, is achieved by setting the pressure compensator 91 on pump 77 to the pressure valve corresponding to the expected maximum foam pressure and appropriately selected safety margin. As the foam pressure reaches the maximum level, the load cell sensing system described above provides an audible alarm warning to the operator to direct the over pressure condition. However, if the foam pressure continues to increase and the cylinder rod end pressure equals or exceeds the compensator 99 setting, the pump automatically short circuits and pumps the hydraulic fluid back to reservoir 76, thus relieving the excess pressure from the belt while at the same time maintaining the necessary belt contact with the foam.

While a presently preferred embodiment of the invention has been shown and described, it may be otherwise embodied within the scope of the apended claims.

What is claimed is:

1. An endless belt molding apparatus comprising:
   a. first and second adjustably spaced rotatable endless belts, said first and second belts being mounted to first and second frame members and said first frame member including support means to support said second frame thereon during molding;
   b. means for vertically adjusting said second frame member relative to said first frame member, said means for adjusting being mounted to said first and second frames member;
   c. a plurality of sensing means mounted on selected support means of said first frame member to support in combination with said support means said second frame member during molding operation, said sensing means providing an output signal proportional to the pressure asserted by said second frame during contact therewith;
   d. drive means including first and second belt drive sprockets operably connected to respective first and second belts and rotatably mounted to said first and second frames; first and second speed reducers operably connected to said respective drive sprockets; a splined, vertically extendable drive coupler connected to said first and second speed reducers; and motor means operably connected to one of said first or second speed reducers for driving said reducer, said drive means including a torque take-up means between said first speed reducer and said first frame,
   e. control means for operating said means for vertically adjusting said second frame, said control means being responsive to said output signals from said sensing means.

2. An apparatus as set forth in claim 1 wherein said means for vertically adjusting said second frame member comprises a plurality of hudraulic cylinders and said control means includes a hydraulic circuit.

3. An apparatus as set forth in claim 1 wherein said motor means is mounted to said second speed reducer and adapted for vertical movement with said second frame member.

4. An apparatus as set forth in claim 1 wherein said splined, vertically extendable drive coupler of said drive means is pivotably connected to said first and second speed reducers.

5. An apparatus as set forth in claim 1 wherein said first and second speed reducers are mounted to said sprockets and include torque arms connecting said reducers to respective first and second frames, said torque take-up means being interposed between said first torque arm and said first frame.

6. An apparatus as set forth in claim 5 wherein said torque take-up means comprises disc springs.

7. An apparatus as set forth in claim 1 wherein said sensing means comprises load cells.

8. An apparatus as set forth in claim 2 wherein said hydraulic cylinders are doubling acting so as to provide a force to clamp the second frame member to said support means and sensing means.

9. An apparatus as set forth in claim 1 wherein said splined, vertically extendable drive coupler comprises inner and outer concentrically splined members adapted to telescope together and apart.

* * * * *